United States Patent [19]

Saisho

[11] Patent Number: 4,923,158

[45] Date of Patent: May 8, 1990

[54] LEGS FOR PROTECTING FURNITURE OR OTHER FITTINGS

[75] Inventor: Satoru Saisho, Machido, Japan

[73] Assignee: Koyo Fastener Co., Ltd., Kanagawa, Japan

[21] Appl. No.: 272,523

[22] Filed: Nov. 16, 1988

[30] Foreign Application Priority Data

Apr. 4, 1988 [JP] Japan .............................. 63-45603[U]

[51] Int. Cl.⁵ .............................................. A47B 91/00
[52] U.S. Cl. .................... 248/188.8; 248/615; 248/677
[58] Field of Search ............... 248/188.8, 188.9, 677, 248/615; 16/32, 33, 42 R, 42 T

[56] References Cited

U.S. PATENT DOCUMENTS

| | | | |
|---|---|---|---|
| 1,580,781 | 4/1926 | Fitch | 16/42 T |
| 2,641,434 | 6/1953 | Henshaw | 16/42 R |
| 2,876,485 | 3/1959 | Cowles | 16/42 T |
| 3,386,125 | 6/1968 | Hand | 16/42 R |
| 3,505,724 | 4/1970 | Leitner et al. | 16/42 R |
| 3,991,537 | 11/1976 | Brown | 248/188.8 X |
| 4,767,105 | 8/1988 | Caspers | 248/188.9 X |

FOREIGN PATENT DOCUMENTS

| | | | |
|---|---|---|---|
| 235603 | 9/1964 | Austria | 160/42 R |
| 806140 | 12/1958 | United Kingdom | 248/615 |

*Primary Examiner*—Reinaldo P. Machado

[57] ABSTRACT

A protective leg for an object such as a piece of furniture comprises a leg body of a hard synthetic resin having at least two grooves or recesses formed in its bottom surface and a plate-like grounding member of a soft synthetic resin having a high coefficient of friction and having cooperatively associated ribs or projections formed on its upper face. In use, the ribs or projections are fitted into the grooves or recesses, thereby fixing the leg body together with the grounding member to the bottom portion of the object to be positioned in place by a fixing means.

5 Claims, 3 Drawing Sheets

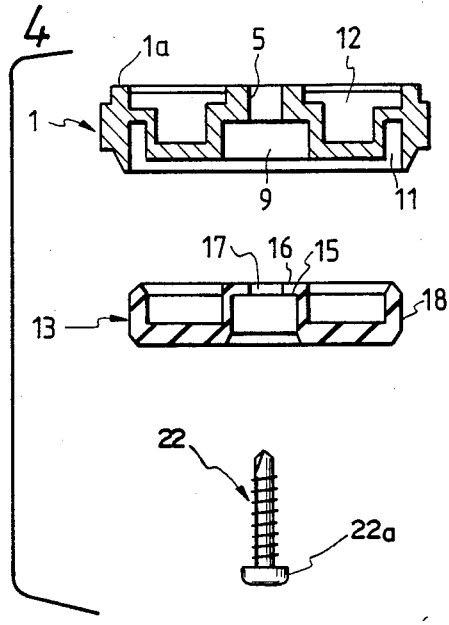
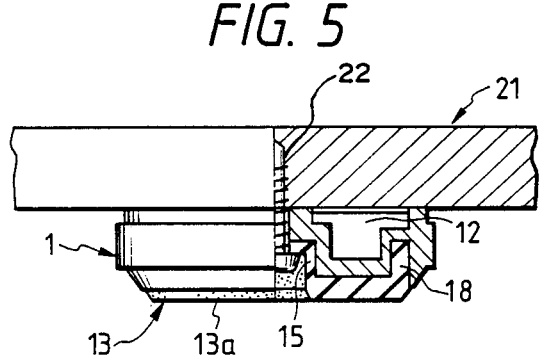
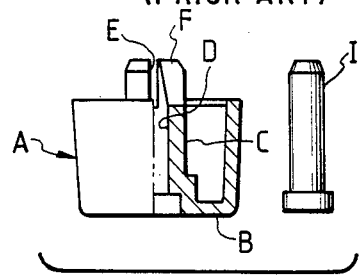
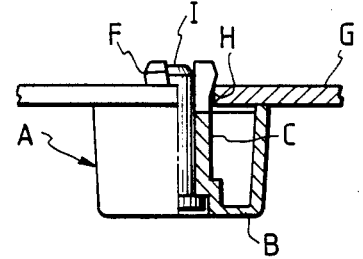

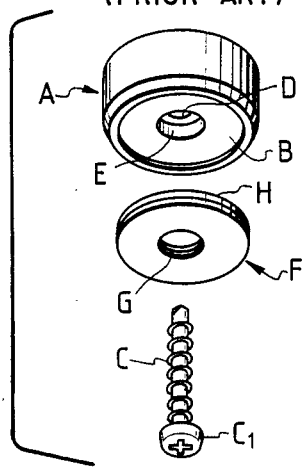
FIG. 8 (PRIOR ART)
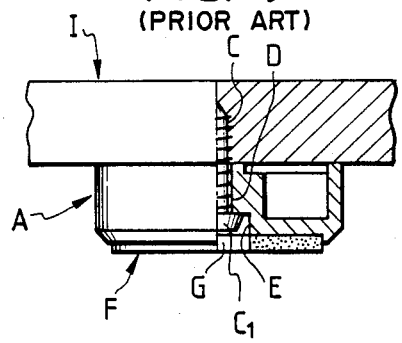
FIG. 9 (PRIOR ART)
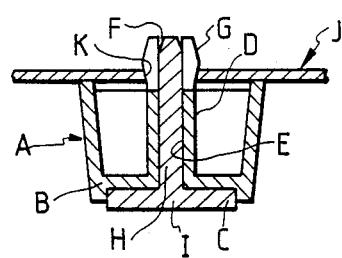
(PRIOR ART) FIG. 10
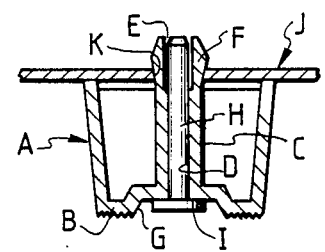
(PRIOR ART) FIG. 11
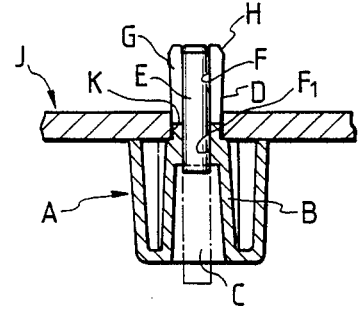
FIG. 12 (PRIOR ART)

LEGS FOR PROTECTING FURNITURE OR OTHER FITTINGS

BACKGROUND OF THE INVENTION

1. Field of the Invention

The present invention relates to a protective leg adapted to be attached to the bottom surface of an object such as furniture or electrical apparatus.

2. Statement of the Prior Art

Furniture, electrical apparatus and other fittings are provided on the bottom portions of their casing with fixed and protective legs. One of the first conventional examples of such protective legs is illustrated in FIGS. 6 and 7, in which A denotes a cylindrical leg body formed of a synthetic resin by way of example, B, a bottom plate, C, a cylindrical rivet portion housed in A and extending vertically from B along the axis of A, and D, a hole extending vertically through C. An extreme end of the inner face of the through-hole D is tapered off. On an extreme end of the portion C, there are radially formed longitudinally split grooves E of a given depth, in which a plurality of stopper pieces F are to be received.

As illustrated in FIG. 7, the extreme end of the rivet portion C is inserted into, and projects from a mount hole H formed in a plate-like bottom portion G of an object such as an item of furniture, and a pin I is driven into the through-hole D in the rivet portion C from its lower end, whereupon the stopper pieces F are enlarged outwardly from the peripheral edge of the mount hole H, so that the leg body A is fixed to the bottom portion G of that object.

According to another, or the second conventional example shown in FIGS. 8 and 9, a disc-like leg body A formed of a hard resin or the like is provided in its bottom portion with a circular recess B of a given depth, and includes an axial through-hole D for a tapping screw C, which through-hole is provided in its lower end with a recess E in which a head portion C1 of the tapping screw C is received. F is a disc-like rubber or felt member to be fitted into said circular recess B, which is centrally provided with a round hole G having a diameter equal to that of the recess E. A release sheet H is applied over an adhesive agent coated on the upper face of the rubber or felt member F.

During use, the release sheet H is first removed from the rubber or felt member F. Afterwards, the member F is adhesively bonded onto the circular recess B in the leg body A, the upper face of the leg body A is then brought into contact with the bottom portion of an object I to insert the tapping screw C into the through-hole D from below, thereby fixing the leg body A in place.

Referring to a further, or a third conventional example shown in FIG. 10, a cupped leg body A includes recess C in its bottom plate B, and a cylindrical member D axially extends from the bottom plate B with a hole E extending vertically therethrough. The upper end of the cylindrical member D is longitudinally split at F, from which a plurality of stoppers G extend. It is noted that each stopper G is tapered off on its inner face. Further, an insert H to be fitted into the through-hole E in the cylindrical member D is provided at its lower end with a flange member I to be fitted into said recess C, which has an increased friction resistance and is elastic.

After the stoppers G of the leg body A have been inserted into a through-hole K formed in a lower panel J of an apparatus, the insert H is forced into the through-hole E in the cylindrical member D, whereupon the tapered inner faces of the stoppers G are enlarged by its upper end to fix the leg body A onto the lower panel J, while the flange member I is fitted into the recess C in the leg body A and projects downwardly from its bottom (see Japanese Utility Model Publication No. 54(1979)-21252).

Referring to a still further, or the fourth conventional example shown in FIG. 11, a cupped leg body A is provided on the upper face of its bottom plate B with an axially upright cylindrical member C including a hole D extending vertically therethrough. The member C is longitudinally split at E in its upper end, from which a plurality of stoppers F, each tapered of on its inner face, extend. Further, the member C is provided in its lower end with recess G. An insert H to be inserted into the through-hole D in the member C is provided in its lower end with a head portion I to be fitted into the recess G.

After the stoppers F of the leg body A have been inserted into a through-hole K formed in a lower panel J of an apparatus, the insert H is inserted into the through-hole D in the cylindrical member C, whereupon the tapered inner faces of the stoppers F are enlarged by its upper end to fix the leg body A onto the lower panel J, while the the head I of the insert H is fitted into the recess G in the leg body A (see Japanese Utility Model Publication No. 55(1980)-23404).

Finally, a still further, or the fifth conventional example is shown in FIG. 12, which includes a main leg body A in the cylindrical form, an inner cylindrical body B contiguous to a lower face of the main leg body A and vertically provided coaxially therewith, and a through-hole C formed in B, which is open at its lower and upper ends. Within a rivet member D extending upwardly from the upper face of such through-hole C, there is axially formed an insert hole F for a drive pin E in communication with the through-hole C, the inner face of said hole F being tapered off upwardly so as to decrease in thickness. Further, the rivet member D is radially provided with a longitudinally split groove G of a depth sufficient to reach near the upper face A1 of the main leg body A, thus defining a free end H. It is noted that, as shown by a dot-and-dash line, the drive pin E is coaxially positioned within the through-hole C prior to use, while the extreme end thereof is made integral with an entrance open end F1 of the insert hole F by way of a weak connection (not shown) with the base end thereof projecting downwardly from the lower face of the main leg body A.

The rivet member D of the main body A is inserted in a mount hole K formed in a bottom plate J of a piece of furniture so as to bring the upper face of the main leg body A into abutment against the bottom plate J. As the drive pin E is then driven into the insert hold F in the rivet member D, the weak connection is broken out so that the drive pin E moves into the insert hole F, while its extreme end slides over the tapered inner face of the free end H. In this manner, the free end H is enlarged outwardly, thereby fixing the main leg body A onto the bottom plate J (see Japanese Utility Model Publication No. 60(1980)1288).

In general, such protective legs desirably prevent easy movement of electrical apparatus or other fittings so as to avoid accidents while exhibiting a rigidity sufficient to withstand the weight of electrical apparatus or other fittings.

However, although the first conventional example is capable of bearing the weight of the product because of the leg body A being formed of a hard synthetic resin, it is disadvantageous with regard to its ease of sliding and in that any vibration-preventing effect is minimal. Nor is any effect upon the prevention of floor damages to be expected.

The second conventional example example exhibits increased frictional resistance, since the leg body A is additionally provided on its bottom surface with rubber, felt and so on, as shown at F. With this embodiment therefore, some preventive effect upon the inadvertent movement or vibration of the object or the prevention of damage to a floor, on which the object is mounted, are expected. However, since the rubber or felt F is only bonded to the bottom surface of the leg body A by means of adhesives, it tends to be easily peeled off therefrom, when the object is forcibly dragged or strikes an obstacle, or owing to temperature conditions, it change thereof with time and the like. Especially in the case of soft rubber, it is likely to deform upon bearing a large weight, or the deterioration thereof with time, thus failing to maintain its initial performance. Felt makes the product very expensive.

The disadvantages of the third conventional example are that, since the insert H designed to enlarge the stoppers G and be fixed to the lower panel J is made integral with the elastic grounding member I of an increased frictional resistance, the grounding member I is immediately released from the bottom surface of the leg body A and the insert H is pulled out of the stoppers G, thereby disengaging the leg body A from the lower panel J, when the apparatus is dragged.

The fourth conventional example exhibits a disadvantage similar to that of the first conventional example due to the leg body A being formed of a hard resin or the like, and the fifth conventional example is disadvantageous in that it is of a complicated configuration which requires a complicated mold, thus resulting in a decrease in the productivity and a rise in cost.

SUMMARY OF THE INVENTION

A purpose of the present invention is to solve the problems as mentioned above by providing a protective leg including a leg body fixed to the bottom surface of an object, the body being formed of a material having a high rigidity, and a grounding member brought in contact with an application surface on which said object is positioned in place, said member being formed of a material having a low rigidity and a high coefficient of friction, and being fixedly fitted into the bottom portion of said leg body without using any adhesives, while being fixed to the bottom surface of said object together with said leg body, whereby it is allowed to withstand the weight of said object and has an effect upon said object in sliding or vibrating, and said grounding member is prevented from disengaging from said leg body, even when said object is forcibly dragged or strikes an obstacle.

According to the present invention, this object is principally achieved by a protective leg for an object such as a piece of furniture characterized by a leg body of a hard synthetic resin having at least two grooves or dents formed in its bottom surface and a plate-like grounding member of a soft synthetic resin having a high coefficient of friction and having cooperatively associated ribs or projections formed on its upper face, said ribs or projections being fitted into said grooves or dents, thereby fixing said leg body together with said grounding member to the bottom portion of said object by a fixing means. After said grounding member has been fixedly fitted into the bottom portion of said leg body, the upper surface of said leg body is brought into contact with the bottom portion of the object so as to fix said leg body together with said grounding member to the bottom portion of the object by the fixing means.

BRIEF DESCRIPTION OF THE DRAWINGS

FIG. 4 is a longitudinally sectioned view of parts or components, showing the second embodiment of the protective leg according to the present invention, FIG. 5 is a side view, partly cut-away, of said protective leg structure in use, FIG. 6 is a partly cut-away side view of parts or components of a conventional protective leg structure for furniture or other fittings, FIG. 7 is a partly cut-away side view of said protective leg structure, FIG. 8 is a perspective view of parts or components of another conventional protective leg structure, FIG. 9 is a partly cut-away side view of said protective leg structure, and FIGS. 10, 11 and 12 are longitudinally sectioned view of further conventional different protective legs in use.

DETAILED EXPLANATION OF THE PREFERRED EMBODIMENTS

Figure 1:
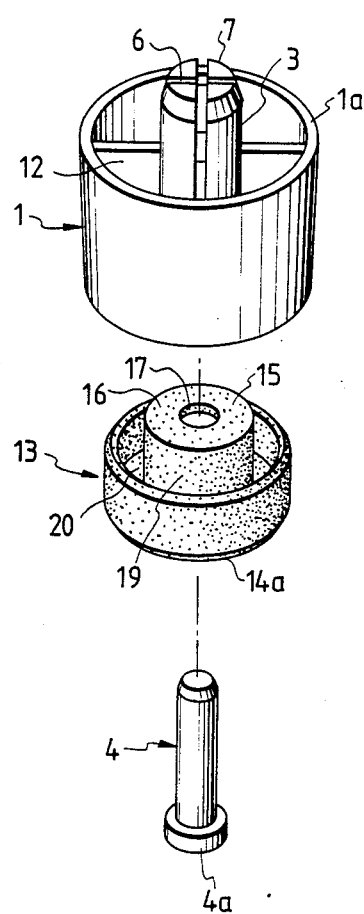
FIG. 1 is a perspective view of parts or components, showing the first embodiment of the protective leg for furniture or other fittings according to the present invention.
Figure 2:
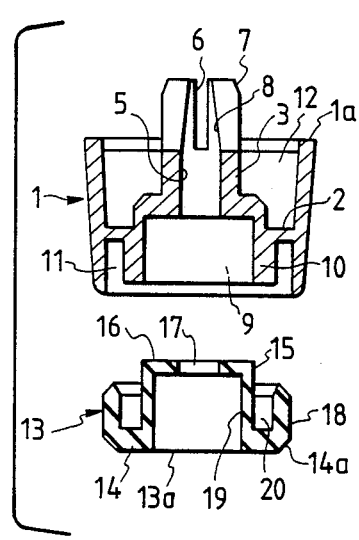
FIG. 2 is a longitudinally sectioned view of said parts or components.
Figure 3:
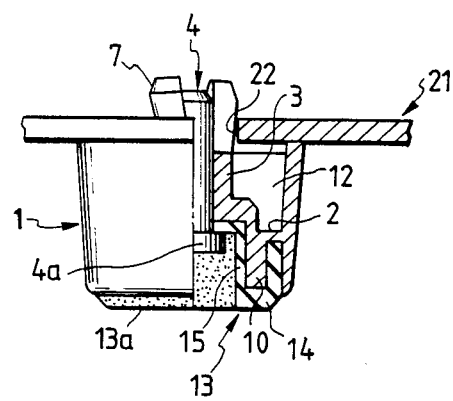
FIG. 3 is a side view, partly cut-away, of the protective leg structure in use.

Referring first to FIGS. 1 to 3 showing the first embodiment of the present invention, a leg body 1 in the cylindrical form is formed of a hard synthetic resin, and includes a lateral partition 2 for dividing its interior in a vertical direction into upper and lower portions. On the center of the partition 2, there is provided a vertically-oriented rivet member 3 which projects from an upper surface 1a of the leg body 1. In the rivet member 3, there is formed a through-hole 5 through which a fixing means or pin 4 is to be axially inserted.

The rivet member 3 is radially provided with longitudinally split grooves 6 of a depth reaching the upper surface 1a of the leg body 1, thereby defining a plurality of stopper pieces 7. The inner face of the rivet member 3 tapers inwardly toward the end at 8. The partition 2 is further provided on its back side with a recess 9 which is open downwardly along the same axis as the rivet member 3. Between an inner cylinder portion 10 which defines this recess 9 and the leg body 1, there is formed a peripheral annular groove 11 concentric with the recess 9. It is noted that reference numeral 12 denotes a reinforcing rib radially formed so as to make connections between leg body 1, partition 2 and the rivet member 3.

A plate-like grounding member 13 to be fitted into a bottom portion of the leg body 1 is formed of a soft synthetic resin having a high coefficient of friction, and is centrally provided with an axial projection 15 extending from the bottom portion 14 to be fitted into the recess 9. The projection 15 is provided in its upper or top surface 16 with a hole 17 for the insertion of the pin 14 at a position coaxial with the through-hole 5.

The grounding member 13 is provided around its bottom portion 14 with a peripheral wall 18 to be fitted into the peripheral groove 11. Between this peripheral wall 18 and an inner cylinder portion 19 for defining the projection 15, there is formed a groove 20 for receiving the inner cylinder portion 10 of the leg body 1. It is noted that a grounding surface 13a of the grounding member 13 is such that it projects from the bottom portion of the leg body 1, when the grounding member 13 is fitted thereinto. It is also appreciated that the outer periphery of the bottom portion 14 of the grounding member 13 is chambered so as to form a tapered face 14a for absorbing impacts or shocks at the time when an object to be positioned in place such as an item of furniture is forcibly dragged or strikes an obstacle. It is further understood that the pin 4 is formed at its base end with a stopper head 4a which prevents it from entering into the hole 17 in the grounding member 13.

In use, the projection 15 and peripheral wall 18 of the grounding member 13 are respectively fitted into the recess 9 and peripheral groove 11 in the leg body 1 with the grounding surface 13a of the grounding member 13 projecting from the bottom portion of the leg body 1. Afterwards, the rivet member 3 is inserted into a through-hole 22 in the plate-like bottom surface of the object to be positioned in place, and projects from the upper face of the bottom portion 21 to bring the upper surface 1a of the leg body 1 into contact with the lower face of the bottom portion 21.

Then, as the pin 4 is driven into the through-hole 5 in the leg body 1 through the hole 17 in the grounding member 13, the extreme end of the pin 4 is slid upwardly over the tapered face 8 of the rivet member 3, so that a plurality of the stopper pieces 7 are enlarged outwardly from the inner wall of the through-hole 22 to fix the leg body 1 to the bottom portion 21 of the object. At that time, the head 4a of the pin 4 is brought into abutment against the upper surface 16 of the projection 15 of the grounding member 13.

In accordance with this embodiment as mentioned above, the grounding member 13 is fixed to the recess 9 and peripheral groove 11 in the leg body 1 through cooperative engagement of its projection 15 and peripheral wall 18; the grounding member 13 is fixed together with the leg body 1 to the bottom portion 21 of the object; and the outer periphery of the grounding face 13a of the grounding member 13 is chamfered to form the tapered face 14a, whereby it is very unlikely that the grounding member 13 may disengage from the leg body 1, even when, for example, the object is forcibly dragged or strikes an obstacle. Because the grounding member 13 is formed of a soft material, it serves to absorb vibrations exerted upon the object, thus preventing damaging of the surface of the object through which it is positioned on a floor, etc.

Referring now to FIGS. 4 and 5 showing the second embodiment of the present invention, a leg body 1 in the flat disk form is made of a high-rigidity material. As is the case with the first embodiment, it is provided therein with a recess 9 and the surrounding peripheral groove 11. The recess 9 is centrally provided with a through-hole 5 for a fixing means 2 or tapping screw. A grounding member 13 formed of a soft material is provided with a projection 15 and a peripheral wall 18 which are to be fitted into the recess 9 and peripheral groove 11. The projection 15 is provided with a hole 17 for the insertion of the tapping screw 22 in the center of its upper or top surface 16. Throughout FIGS. 4 and 5, like part components in the first embodiment are indicated by like reference numerals.

In a similar manner as explained in connection with the first embodiment, the projection 15 and peripheral wall 18 of the grounding member 13 are fitted into the recess 9 and peripheral groove 11 of the leg body 1 to project a grounding face 13a of the member 13 from the bottom portion of the leg body 1. Thereafter, the upper surface 1a of the leg body 1 is brought into contact with the lower surface of the bottom portion 21 of an object to be positioned in place.

Then, the tapping screw 22 is inserted into the through-hole 5 in the leg body 1 through the hole 17 in the grounding member 13, and is screwed into the bottom portion 21 of the object, whereby the leg body 1 is fixed to the bottom portion 21.

In the embodiments as explained in the foregoing, the fixation of the leg body 1 to the grounding member 13 is described as being achieved by the inter-fitting of the peripheral wall 18 into the peripheral groove 11. However, a plurality of grooves may be formed outwardly and radially from the outer periphery of the inner cylinder portion 10 in place of the peripheral groove 11, and a plurality of projections to be fitted into said plurality of grooves may be formed outwardly and radially on the grounding member 13 in place of the peripheral wall 18. This may give rise to an increase in the structural strength of the bottom portion of the leg body 1.

As stated above, the protective leg according to the present invention includes a leg body of a hard synthetic resin having at least two grooves or recesses formed in its bottom surface and a plate-like grounding member of a soft synthetic resin having a high coefficient of friction and having operatively associated ribs or projections formed on its upper surfaces, said ribs or projections being fitted into said grooves or recesses, thereby fixing said leg body together with said grounding member to the bottom portion of said object by fixing means.

Thus, the present protective leg can support an item of furniture without deformation under its load, since the grounding member is in planar form and the ribs or projections formed on its upper surface function as reinforcing members.

The present protective leg can support an object with increased structural strength, even when it is dragged under a load, since the ribs or projections function as reinforcing members. Further, since the said ribs or projections are fitted into the grooves or recesses of the leg body of a hard material, a horizontal elastic deformation of the grounding member is limited by the leg body with no fear of the grounding member being warped or peeled off due to its deformation.

In addition since the leg body is coupled to the grounding member by inter-fitting and both components are fixed to the bottom portion of an object by fixing means, when the object is dragged, a horizontal force acting on the grounding member is applied to the leg body through its ribs or projections, and is thus counteracted by the cooperation of both, leading to an increase in the structural strength.

What is claimed is:

1. A protective leg to be secured to the bottom of furniture or the like, said protective leg comprising a body member having a central recess and a surrounding annular groove each open toward the bottom of said body portion, a supporting base member having a central projection and a peripheral wall portion configured to cooperatively engage said central recess and said annular groove, respectively, of said body member, and means to fix said base member to said body member and to said furniture upon cooperative engagement of said respective portions.

2. The protective leg of claim 1, wherein said body member includes multiple outwardly expandable arms extending from the top of said central recess and adapted to receive said means to fix said base member to said body member and to said furniture.

3. The protective leg of claim 2, wherein said means to fix said base member to said body member and to said furniture comprises an elongated pin member which extends through said central recess of said body member and said central projection of said base member and engages said multiple outwardly expandable arms.

4. The protective leg of claim 1, wherein said means to fix said base member to said body member comprises an elongated screw means.

5. The protective leg of claim 1, wherein said body member is comprised of a hard synthetic resin and said base member is comprised of a soft synthetic resin having a high coefficient of friction.

* * * * *